United States Patent
Soubaras

[11] Patent Number: 5,835,451
[45] Date of Patent: Nov. 10, 1998

[54] OFFSHORE SEISMIC PROSPECTING METHOD USING A HYDROPHONE-GEOPHONE SENSOR PAIR

[75] Inventor: Robert Soubaras, Orsay, France

[73] Assignee: Compagnie Generale De Geophysique, Massy, France

[21] Appl. No.: 788,600

[22] Filed: Jan. 22, 1997

[51] Int. Cl.⁶ .................................................. G01V 1/38
[52] U.S. Cl. .................................................. 367/24; 367/21
[58] Field of Search .................................. 367/15, 21, 24

[56] References Cited

U.S. PATENT DOCUMENTS

| | | | |
|---|---|---|---|
| 4,486,865 | 12/1984 | Ruehle | 367/24 |
| 4,887,244 | 12/1989 | Willis et al. | 367/73 |
| 4,935,903 | 6/1990 | Sanders et al. | 367/24 |
| 4,979,150 | 12/1990 | Barr | 367/24 |
| 5,163,028 | 11/1992 | Barr et al. | 367/21 |
| 5,235,554 | 8/1993 | Barr et al. | 367/21 |
| 5,365,492 | 11/1994 | Dragoset, Jr. | 367/21 |
| 5,396,472 | 3/1995 | Paffenholz | 367/24 |
| 5,621,700 | 4/1997 | Moldoveanu | 367/24 |
| 5,696,734 | 12/1997 | Corrigan | 367/24 |

OTHER PUBLICATIONS

"Ocean–Bottom cable dual–sensor scaling", Bill Dragoset and Fred J. Barr, Western Geophysical, SA 1.2, pp. 857–860, SEG 1994.

"A dual–sensor bottom–cable 3–D survey in the Gulf of Mexico", F.J. Barr, et al. SA 1.2, pp. 855–858, SEG 1990.

"Attenuation of Water–Column Reverberations Using Pressure and Velocity Detectors in a Water–Bottom Cable", Fred J. Barr and Joe I. Sanders, Halliburton Geophysical Services, Inc., SA 2.6, pp. 653–656, SEG 1989.

*Primary Examiner*—Ian J. Lobo
*Attorney, Agent, or Firm*—Rosenblatt & Redano P.C.

[57] ABSTRACT

A method of seismic prospecting offshore by means of at least one pair of hydrophone-geophone sensors disposed at the water bottom, in which a sound source at the surface of the water emits a sound signal and the sensors at the water bottom take hydrophone and geophone recordings H and G, the method comprising the following various steps:

a filtered signal is determined such that:

$$M = H_\Delta - G_\Sigma$$

with $$H_\Delta = \tfrac{1}{2}(H - H_R)$$

and $$G_\Sigma = \tfrac{1}{2}(G + G_R)$$

where $H_R$ and $G_R$ correspond respectively to the recordings H and G propagated over a go-and-return path through the layer of water; and the data obtained in this way is processed to deduce therefrom information about the geology of the subsoil.

25 Claims, 5 Drawing Sheets

G   Fig. 3b $H_R$   Fig. 3c $G_R$   Fig. 3d $H_\Sigma$   Fig. 3e $H_\Delta$   Fig. 3f $G_\Sigma$   Fig. 3g $G_\Delta$   Fig. 3h s  Fig.3i $s_T$  Fig.3j M  Fig.3k $U_R$  Fig.3l U  Fig.3m D  Fig.3n $\bar{Z}^{in} U_R/D$

OFFSHORE SEISMIC PROSPECTING METHOD USING A HYDROPHONE-GEOPHONE SENSOR PAIR

FIELD OF THE INVENTION

The present invention relates to a seismic prospecting method using hydrophone-geophone sensors.

BACKGROUND OF THE INVENTION

In offshore seismic prospecting, it is general practice to use cables carrying hydrophone sensors which are towed by ships that also carry sound sources.

Such cables, generally referred to as "streamers" by the person skilled in the art, cannot be used in certain zones, and in particular in production zones cluttered with platforms.

Under such circumstances, the soundwaves emitted by the ships are received by hydrophones placed on the sea bottom.

In these various techniques, the recordings made by the hydrophones must be treated so as to eliminate "ghosts" from the signals obtained (where "ghosts" are primary waves carrying information about sub-surface geology and reflected at the surface of the water), and also possibly to eliminate reverberations, known as "peg-legs", which correspond to multiple reflections at the surface and at the bottom of the water, making recordings difficult to interpret.

Spectrally, ghost waves are equivalent to useful data being filtered via a notch filter which removes frequencies from the signal that are multiples of $f_n = v/(2\Delta z)$, where $\Delta z$ is the depth of the receivers and v is the speed of sound in water (1500 meters per second 30 (m/s)).

When $\Delta z$ is less than 10 m, as is the case for conventional acquisition using hydrophones carried by a cable towed by a ship, $f_n$ is greater than 75 Hz and said notch frequencies lie outside the usable passband. Under such circumstances, the ghost wave appears in the usable passband only as attenuation, and can be eliminated by deconvolution.

However, when hydrophone sensors are placed on the bottom of the water, $\Delta z$ is the depth of the water, which is typically 50 m, so $f_n = 15$ Hz. The passband is punctuated by frequencies at which the response signal is hidden by the ghost wave. Eliminating the ghost wave by deconvolution leads to a large amount of noise being added to the results.

Recently, several techniques have been proposed in which acquisition is performed by means of hydrophone and geophone sensors disposed on the sea bottom.

In particular, U.S. Pat No. 4,486,865 discloses a seismic acquisition method using hydrophones and geophones distributed in pairs at the water bottom, and in which the hydrophone component and the geophone component of a given pair of sensors is deconvoluted by their previously-determined spectral functions, and the deconvoluted data is averaged to obtain an output which corresponds to the up wave immediately above the bottom of the surface of the water, and from which ghost waves have been eliminated.

Nevertheless, that method cannot be used in zones of great depth, for which the seismic passband is punctuated by frequencies at which the response signal is hidden by the ghost wave. Because of deconvolution, the output would then be particularly noisy.

To solve that problem, U.S. Pat. No. 4,979,150 proposes a seismic prospecting method that also makes use of hydrophones and geophones, in which a calibration scalar is applied to the hydrophone component or to the geophone component and the calibrated components obtained in this way are summed.

That treatment seeks to eliminate ghost waves and "peg-leg" type reverberation without requiring deconvolution to be applied to the hydrophone and geophone recordings.

Nevertheless, the resulting output signal is as noisy as the hydrophone and geophone recordings, since it is a linear function thereof.

OBJECTS AND SUMMARY OF THE INVENTION

An object of the invention is to propose a method that enables the drawbacks of the prior art methods to be mitigated, and in particular that makes it possible to provide recordings that are noise-free.

To this end, the invention provides a method of seismic prospecting offshore by means of at least one pair of hydrophone-geophone sensors disposed at the water bottom, in which a sound source at the surface of the water emits a sound signal and the sensors at the water bottom take hydrophone and geophone recordings H and G, the method comprising the following various steps:

a filtered signal is determined such that:

$$M = H_\Delta - G_\Sigma$$

with $$H_\Delta = \tfrac{1}{2}(H - H_R)$$

and $$G_\Delta = \tfrac{1}{2}(G + G_R)$$

where $H_R$ and $G_R$ correspond respectively to the recordings H and G propagated over a go-and-return path through the layer of water; and the data obtained in this way is processed to deduce therefrom information about the geology of the subsoil.

As will be understood better on reading the following description, it should be observed that the filtering corresponding to M is filtering that is matched, and consequently low-noise.

Advantageously, a signal S is determined as a function of the hydrophone and geophone recordings H and G, where the signal S corresponds to the source signal propagated through the water layer to the sensors;

said signal S is truncated in a time window beyond the theoretical extinction time of the source propagated through the layer of water to the sensors; and the data obtained in this way is processed to deduce information about the geology of the subsoil therefrom.

Because of this truncating, the propagated source is also low-noise.

BRIEF DESCRIPTION OF THE DRAWINGS

Other characteristics and advantages of the invention appear further from the following description. The description is purely illustrative and non-limiting. It should be read with reference to the accompanying drawings, in which.

GENERAL DESCRIPTION

Figure 1:
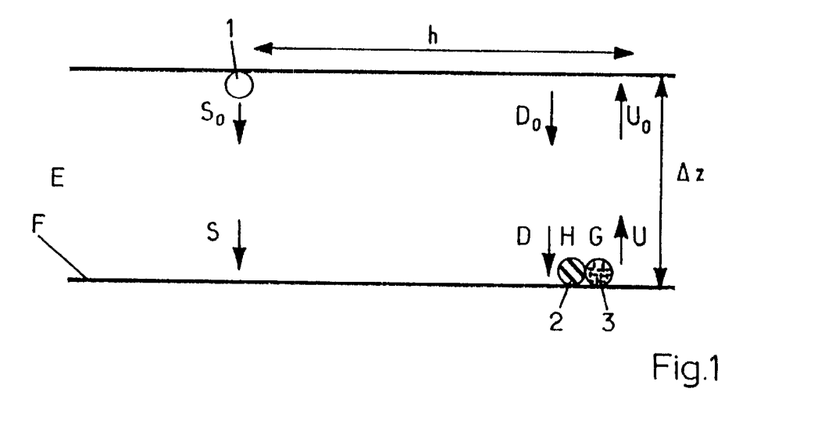
FIG. 1 is a diagram showing the various quantities involved in the model used for the method of the invention.

FIG. 1 shows a sound source 1 emitting a signal $S_0$ at the surface of a layer of water E, together with hydrophone sensors 2 and geophone sensors 3 disposed on the sea bottom F. The layer of water E has a thickness $\Delta z$. The horizontal distance between the sensors 2 and 3 and the source 1 is referenced h.

The hydrophone sensors 2 measure pressure and are isotropic. They record the sum of up soundwaves U and down soundwaves D.

The signals H and G recorded by the hydrophones 2 and the geophones 3 can be written as functions of the up waves U and of the down waves D, as follows:

$$H = U + D \tag{1}$$

$$G = (U-D)/I_0 \tag{2}$$

In equation (2), $I_0$ is the acoustic impedance of the water, $I_0 = \rho V$, where $\rho$ is the density of the water, and v is the speed of sound in the water.

In the text below, $I_0$ is normalized to 1, with the geophone being previously calibrated to measure U–D.

The surface of the water behaves like a reflector having a reflection coefficient of –1 and it adds a down wave to the signal corresponding to the source $S_0$, which down wave is equal to the up wave U, but of opposite sign.

Consequently, at the water bottom, the down wave is written as follows:

$$D = -ZU + Z^{1/2} S_o \tag{3}$$

where Z is an operator corresponding to go-and-return propagation through the layer of water, i.e. to a time delay $\Delta t = 2\Delta z/v$ where v is the speed of sound in the layer of water, and where $Z^{1/2}$ is an operator corresponding to the go propagation of sound between the surface and the bottom of the water.

For a 1D approximation, Z is merely a time delay $\Delta t = 2\Delta z/v$, and $Z^{1/2}$ is a time delay $\Delta z/v$.

In frequency notation, $Z = e^{-2j\pi f \Delta t}$.

When 2D and 3D propagation effects are taken into account, we have the following in the ($\omega$, k) domain, with $\omega = 2\pi f$ where f is the frequency of the signal, and k wave number:

$$Z = e^{-2j\Delta z \frac{\omega}{v} \sqrt{1 - v^2 k^2/\omega^2}} \tag{4}$$

By defining the propagated source S as follows:

$$S = Z^{1/2} S_0$$

the expression for D becomes:

$$D = S - ZU \tag{5}$$

and putting (5) into (1) and (2) gives the following modelling equation:

$$H = S + (1-Z)U \tag{6}$$

$$G = -S + (1+Z)U \tag{7}$$

Consequently, S can be written:

$$S = \tfrac{1}{2}(1+Z)H - \tfrac{1}{2}(1-Z)G \tag{8}$$

For each position of the source and each position of a pair of sensors, it is possible to calculate the arrival time $T_s$ of the seismic source, $T_s = (\Delta Z^2 + h^2)^{1/2}/v$, and its extinction time $T_E = T_S + \Delta T_S$, where $\Delta T_S$ is the duration of the source 1.

The true propagated source must be zero beyond the extinction time $T_E$. The source S as calculated by equation (8) has two types of error compared with an ideal source: firstly it contains random noise coming from random noises affecting the hydrophone and geophone data; and secondly the propagation operator Z used is not necessarily exact.

If the hydrophone and geophone data are properly calibrated, it is possible for the source S as estimated by (8) to be truncated beyond the extinction time of the propagated source and in the zone in which the propagation operator is valid. This zeroing of the random noise has the effect of reducing random noise at the output U.

On the basis of the data H and G, it is also possible to calculate the auxiliary output M:

$$M = \tfrac{1}{2}(1-Z)H - \tfrac{1}{2}(1+Z)G \tag{9}$$

Equations (6) and (7) show that the hydrophone H measures U as filtered by (1–Z), and that the geophone measures G as filtered by (1+Z). The auxiliary output M is thus matched filtering and is consequently low-noise.

By replacing H and G in (9) with the expressions given in (6) and (7), it can be seen that M measures:

$$M = S - 2ZU \tag{10}$$

It is thus possible to deduce U from S and M.

Figure 2:
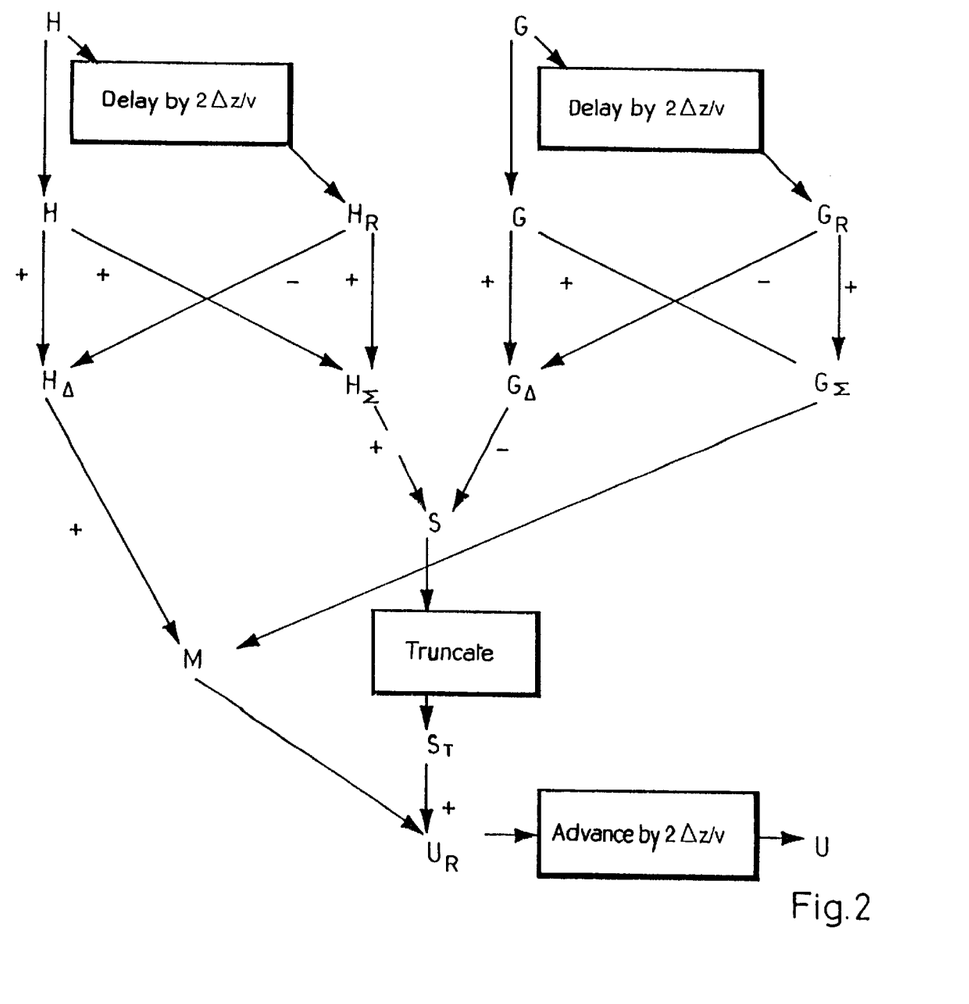
FIG. 2 is a summary chart showing one possible implementation of the method of the invention.
Figure 3A:
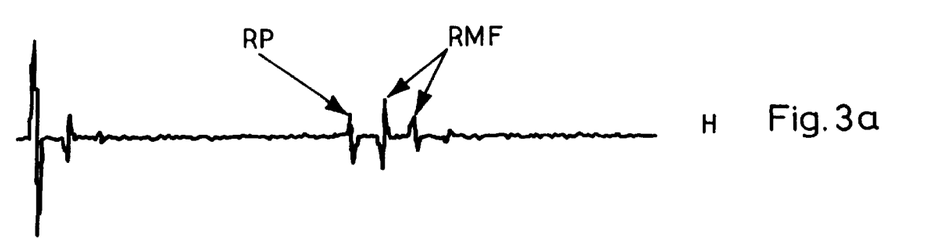
FIGS. 3a to 3o show the various signals obtained in the various steps of the method of the invention in response to a pulse source signal.

As shown in FIG. 2, the up wave U is calculated in the manner described below. FIGS. 3a to 3o show the various signals obtained from the various processing steps in this implementation of the invention.

Figure 3B:
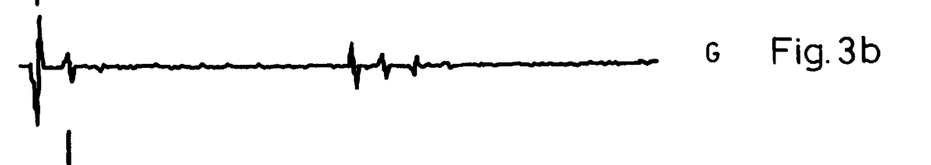

In particular, FIGS. 3a and 3b respectively show the hydrophone recording and the geophone recording as obtained. In FIG. 3a, primary reflections are marked RP while ghost and peg-leg type multiple reflections are marked RMF.

Figures 3C, 3D:
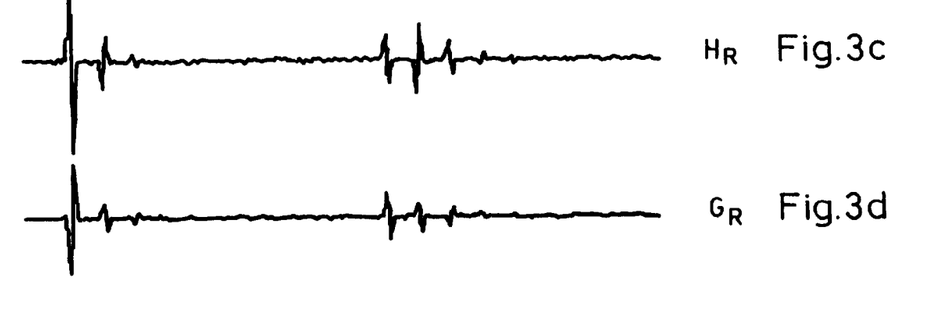

$H_R$ and $G_R$ (FIGS. 3c, 3d) which are the hydrophone and geophone data propagated over a go-and-return path in the layer of water are calculated as follows:

$$H_R = ZH \tag{11}$$

$$G_R = ZG \tag{12}$$

Figure 3E:
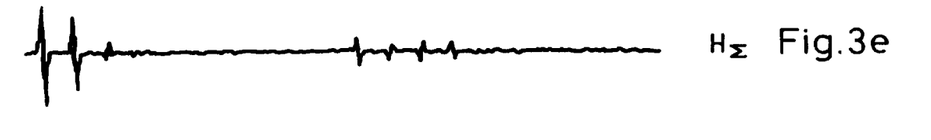
Figure 3F:
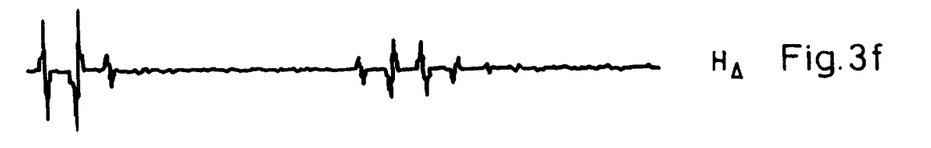
Figure 3G:
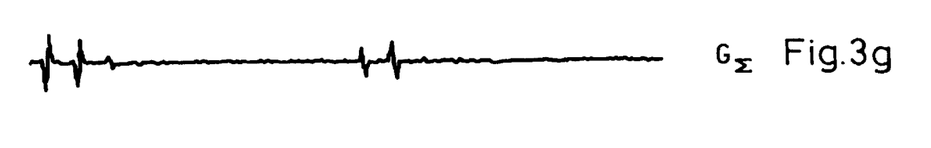
Figure 3H:
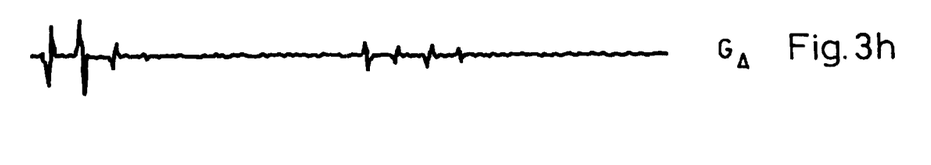

Then the hydrophone and geophone sum and difference paths (FIGS. 3e to 3h) are calculated as follows:

$$H_\Sigma = \tfrac{1}{2}(H + H_R) \tag{13}$$

$$H_\Delta = \tfrac{1}{2}(H - H_R) \tag{14}$$

$$G_\Sigma = \tfrac{1}{2}(G + G_R) \tag{15}$$

$$G_\Delta = \tfrac{1}{2}(G - G_R) \tag{16}$$

Figures 3I, 3J, 3K, 3L:
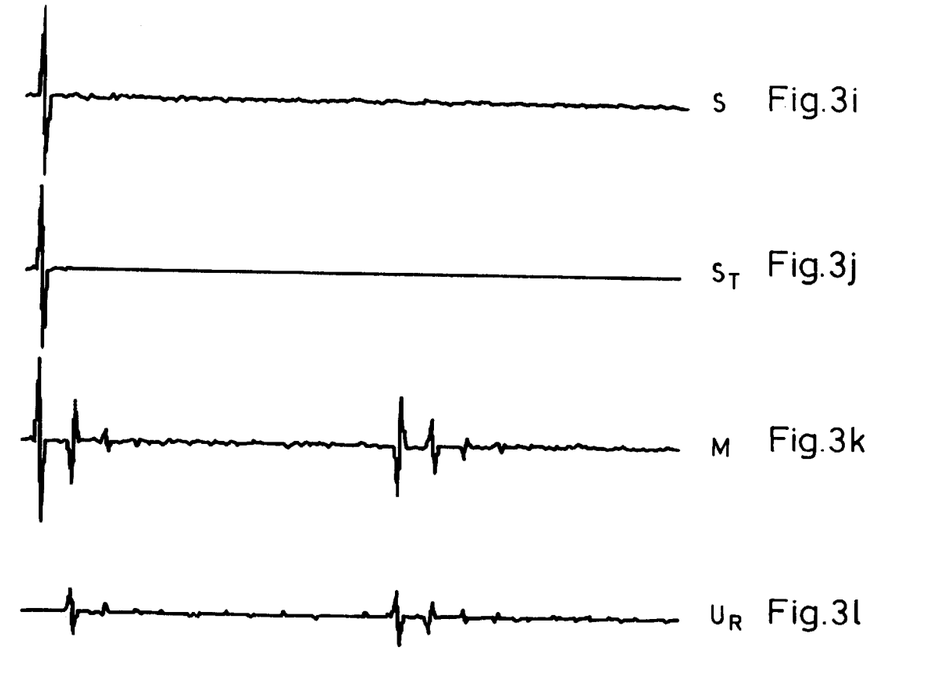

Thereafter the source (FIG. 3i) and the truncated source (FIG. 3j) are calculated as follows:

$$S = H_\Sigma - G_\Delta \tag{17}$$

$$S_T = \text{truncated } S \tag{18}$$

$S_T$ is calculated by truncating S in a time window beyond the extinction time of the source $T_E$ and in the zone where the propagation operator Z used in (11) and (12) is valid. This validity zone is generally defined for each source position and receiver position by a validity time $T_p$ beyond which the approximation is valid. $S_T$ is thus calculated in this case by zeroing the S data for times greater than $MAX(T_E, T_p)$.

Thereafter the matched filtering output (FIG. 3k) is calculated:

$$M = H_\Delta - G_\Sigma \qquad (19)$$

and then the retarded up wave (FIG. 3l):

$$U_R = \tfrac{1}{2}(S_T - M) \qquad (20)$$

Figure 3M:
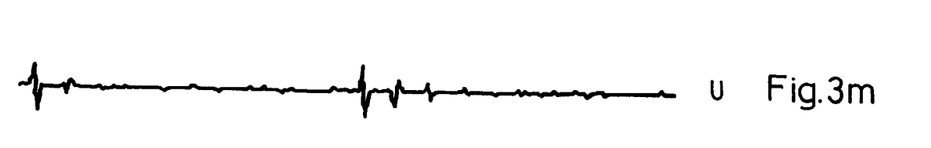

Finally, the up wave is calculated (FIG. 3m):

$$U = Z^{-1} U_R \qquad (21)$$

In 1D approximation, Z is a time delay $2\Delta z/v$, and $Z^{-1}$ is a time advance $2\Delta z/v$, i.e. (11), (12) and (21) can be written as follows:

$$H_R(t) = H(t - 2\Delta z/v) \qquad (11')$$

$$G_R(t) = G(t - 2\Delta z/v) \qquad (12')$$

$$U(t) = U_R(t + 2\Delta z/v) \qquad (21')$$

At the output U the ghost wave is eliminated and in addition noise is attenuated since it is calculated from $S_T$ which has low noise because truncation eliminates much of the noise, and from M which has low noise because it corresponds to a matched filter.

Peg-leg multiple reflections can be removed by subsequent processing. They appear in the same manner in the hydrophone data and in the geophone data. Consequently, the resulting U outputs can be processed in the same manner as conventional seismic data.

Figure 3N:
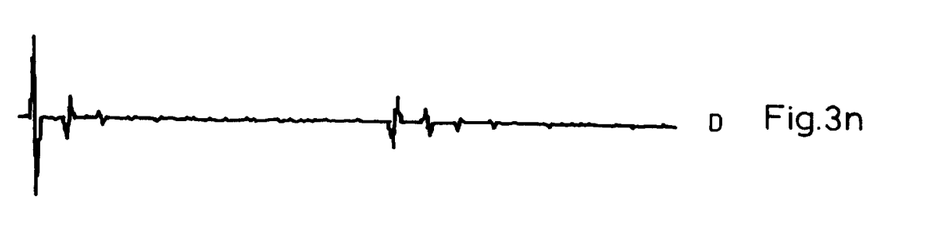
Figure 3O:
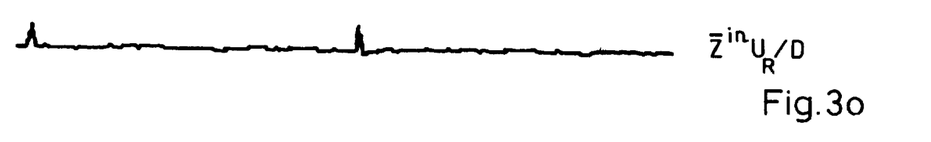

The down wave D is calculated by (FIG. 3n):

$$D = \tfrac{1}{2}(S_T - M) \qquad (22)$$

Peg-leg multiple reflections associated with the positions of the receivers can be removed by estimating the up wave $U_1$ immediately beneath the water.

$U_1$ is calculated from:

$$U_1 = (U - kD)/(1 - kD)$$

where k is the reflection coefficient of the bottom of the water.

In practice, it is possible to calculate a water bottom transfer function k(t) for a given time medium, and then:

$$U_1 = U \; k^* D$$

where * designates the convolution operator.

The water bottom transfer function k(t) can be calculated by minimizing the energy of $U_1$ in a given time window. Two cases can arise:

either the water bottom reflector is isolated, in which case a window is taken that does not contain the reflector;

or else the reflectors running along the water bottom are too close to be isolated therefrom, in which case a large window is taken containing a large number of reflectors.

Peg-leg multiple reflections can also be removed by deconvolution of the up waves U by the down waves D. This operation removes all multiple reflections that reflect at the surface of the water, and also the seismic source.

Two or Three-Dimensional Propagation Operators

Implementation of the invention is described below using two-dimensional or three-dimensional operators Z for go-and-return propagation through the layer of water (water bottom, water surface, water bottom).

For example, once all of the geophones have been calibrated, the data is organized as a collection sharing a common firing point by putting together all of the seismic traces for which the position of the source is the same. The water bottom wave field $H(\Delta z, t, x, y)$ and $G(\Delta z, t, x, y)$ is thus obtained, where x and y designate coordinates in the plane of the water bottom and where t is the time variant.

"Deghosting", i.e. estimating up waves U and down waves D immediately above the water bottom and that are free from ghost waves can then be performed by considering the two- or three-dimensional nature of wave propagation.

In the three-dimensional case, the pressure $H(z, \omega, k_x, k_y)$ measured at depth z, where $\omega = 2\pi f$, and $k_x$ and $k_y$ are the Fourier variables corresponding to t, x, and y, can thus be written as the sum of an up wave and of a down wave. Using the following notation:

$$k^2 = k_x^2 + k_y^2$$

$U_0(\omega, k_x, k_y)$=up wave at the water surface
$D_0(\omega, k_x, k_y)$=down wave at the water surface
$\rho$=density of the water.

It is posible to write:

$$H(z, \omega, k_x, k_y) = U_0(\omega, k_x, k_y) e^{jz(\omega/v)\sqrt{1 - v^2 k^2/\omega^2}} + \qquad (23)$$
$$D_0(\omega, k_x, k_y) e^{-jz(\omega/v)\sqrt{1 - v^2 k^2/\omega^2}}$$

Newton's equation links the time derivative of the velocity vector V to the space partial derivatives of pressure p:

$$\rho \frac{\partial}{\partial t} V = -\nabla p \qquad (24)$$

In particular, for the vertical component z:

$$\rho \frac{\partial V_z}{\partial t} = -\frac{\partial p}{\partial z} \qquad (25)$$

A geophone measures the velocity $-V_z$, i.e. the negative of the vertical velocity, and the hydrophone measures pressure p. Thus:

$$\rho \frac{\partial G}{\partial t} = j \omega \rho G = -\frac{\partial H}{\partial z} \qquad (26)$$

i.e. by replacing H with its expression (23):

$$G(z, \omega, k_x, k_y) = (\sqrt{1 - v^2 k^2/\omega^2} \; /\rho v)\,[U_0(\omega, k_x, k_y) \cdot \qquad (27)$$
$$e^{jz(\omega/v)\sqrt{1 - v^2 k^2/\omega^2}} - D_0(\omega, k_x, k_y) e^{-jz(\omega/v)\sqrt{1 - v^2 k^2/\omega^2}}\,]$$

A wave whose propagation direction is at an angle $\theta$ to the vertical is defined in the $(\omega, k_x, k_y)$ domain by $k = \omega \sin\theta v$. Thus:

$$\sqrt{1 - v^2 k^2/\omega^2} = \cos\theta \qquad (28)$$

Also, the impedance of the water is $I_0 = \rho v$.

Finally, the up and down waves at the water bottom, at depth $z = \Delta z$ are written U and D. This gives:

$$U(\omega, k_x, k_y) = U_0(\omega, k_x, k_y) e^{j\Delta z(\omega/v)\sqrt{1-v^2k^2/\omega^2}} \quad (29)$$

$$D(\omega, k_x, k_y) = D_0(\omega, k_x, k_y) e^{-j\Delta z(\omega/v)\sqrt{1-v^2k^2/\omega^2}} \quad (30)$$

H and G as measured at the water bottom then satisfy:

$$H = U + D \quad (31)$$

$$\frac{I_0}{\cos\theta} G = U - D \quad (32)$$

By comparing equations (31) and (32) with equations (1) and (2), it can be seen that to reduce the 2D case or the 3D case to the 1D case, it is necessary to correct the geophone component by dividing its amplitude by $\cos\theta$. For a measured geophone component $G_{3D}$, this can be written:

$$G = G_{3D}/\cos\theta \quad (33)$$

Once this compensation has been performed, equations (1) and (2) become valid. The processing is thus identical, but whereas the operator Z for go-and-return propagation through the layer of water (bottom, surface, bottom) is given by $Z = e^{-2j\Delta z\omega/v}$ in the 1D case, in the 2D or 3D case it is given by the following expression in the $(w, k_x, k_y)$ domain:

$$Z = e^{-2j\Delta z(\omega/v)\sqrt{1-v^2k^2/\omega^2}} = e^{-2j\Delta z\omega\cos\theta/v} \quad (34)$$

Equations (33) and (34) are valid in the 1D, 2D, and 3D cases. In the 2D case, it is necessary to put $k_y=0$, i.e. $k=k_x$, and in the 1D case, $k_x=k_y=0$, i.e. $k=0$ and $\cos\theta=1$.

For a two- or three-dimensional operator Z, it is possible to define the zone of validity of said operator in the $(\omega, k)$ domain rather than just using a validity time $T_p(i)$. Under such circumstances, the truncated source $S_T$ is calculated by truncating the source S for times greater than $T_E$ and by eliminating from the truncated portion the zone of the $(\omega, k)$ domain in which the operator Z is valid.

An implementation in the $(\omega, k_x, k_y)$ domain is described below:

1) For each position of the seismic source, the data $H(t,x,y)$ and $G(t,x,y)$ corresponding to recordings performed by the hydrophone and geophone receivers at positions $(x,y)$ on the water bottom is collected together.

2) The Fourier transform $(t,x,y) \rightarrow (\omega, k_x, k_y)$ is performed.
3) Evanescent waves are removed such that $(1 - v^2k^2/\omega^2) < 0$ in the Fourier transform $h(\omega, k_x, k_y)$ of $H(t,x,y)$. 4) Evanescent waves are removed from the Fourier transform $g(\omega, k_x, k_y)$ of $G(t,x,y)$, and the propagating waves are divided by $\sqrt{1-v^2k^2/\omega^2}$.

5) The steps of the 1D case are performed, with the propagation operator z being given by (29).

The propagation operator Z can also be applied in the $(\omega, x, y)$ domain or in the $(t, x, y)$ domain. This makes it possible to process the case where the water bottom is arbitrary without it being necessary to assume that it is plane and horizontal.

The person skilled in the art will recognize in the operator $S = Z^{1/2}S_0$ an operation known as "datuming" which calculates the recording S of a wave at the water bottom on the basis of the recording So made at the surface of the water of said wave which is assumed to be a down wave. This operation consists in extrapolating a field from one surface to another and it can be performed, in particular, by the Kirchhoff method. The datuming operation $D = ZU$ must be understood as being two calculations in succession: calculating the water surface recording $U_0$ from the up wave recording U made at the water bottom, followed by calculating the water bottom recording D from a down wave having $U_0$ as its surface recording.

Hydrophone and Geophone Noise Power Ratio

The text below relates to the case where hydrophone noise is not of the same power as geophone noise.

It can be assumed that the hydrophone and geophone components are contaminated by additive noise of spectral power densities $V_H(f)$ and $C_G(f)$. It is assumed that the ratio $A(f) = V_H(f)/V_G(f)$ of the hydrophone noise power divided by the geophone noise power at each frequency is known. To estimate this ratio, it is possible, for example, to use the hydrophone and geophone data prior to times $T_S(i) = (\Delta z(i)^2 + h(i)^2)^{1/2}/v$ corresponding to the arrival of the signal so that only noise is present. The index i corresponds to the successive positions of the source.

In the method described above, it has been implicitly assumed that $A(f) = 1$, i.e. that the hydrophone component contains the same amount of noise as the geophone component. Unfortunately, the geophone component is quite often noisier than the hydrophone component, in other words $A(f) < 1$.

$A(f)$ can be used so as to ensure that the output from the processing has as little noise as possible.

When account is taken of noise in the hydrophone and geophone components, equations (6) and (7) become:

$$H = (1-Z)U + N_H = T_H(f)U(f) + N_H(f) \quad (35)$$

$$G = (1+Z)U + N_G = T_G(f)U(f) + N_G(f) \quad (36)$$

where $N_H$ and $H_G$ designate the noise in H and G in the time domain, and $N_H(f)$ and $N_G(f)$ represent the same noise in the frequency domain.

Writing $T_H = 1-Z$ and $T_G = 1+Z$, it is assumed that the water surface is a perfect mirror having a reflection coefficient $-1$. It is also possible to model the water surface as being a reflector having a transfer function $-r$, where r may depend on f or on f and k. For this purpose, equation (5) is replaced by:

$$D = S - rZU \quad (5')$$

New expressions for H, G, and S are deduced therefrom replacing equations (6) to (8):

$$H = S + (1-rZ)U \quad (6')$$

$$G = -S + (1+rZ)U \quad (7')$$

$$S = \tfrac{1}{2}(1+rZ)H - \tfrac{1}{2}(1-rZ)G \quad (8')$$

Equations (35) and (36) remain valid but with $T_H = 1-rZ$ and $T_G = 1+rZ$.

Putting $r \neq 1$ leads in particular to calculating intermediate magnitudes $H_\Sigma$, $H_\Delta$, $G_\Sigma$, $G_\Delta$ having the following expressions replacing expressions (13) to (16):

$$H_\Sigma = \tfrac{1}{2}(H + rH_R) \quad (13')$$

$$H_\Delta = \tfrac{1}{2}(rH - H_R) \quad (14')$$

$$G_\Sigma = \tfrac{1}{2}(rG + G_R) \quad (15')$$

$$G_\Delta = (G - rG_R) \quad (16')$$

It is assumed that $r = 1$ to simplify the explanation, but the procedure is the same for arbitrary r.

$U(f)$ can be calculated by the maximum likelihood method by assuming that the noise $N_H(f)$ and $N_G(f)$ is Gaussian. This reduces to minimizing the following for all f:

$$E = \frac{|N_H(f)|^2}{V_H(f)} + \frac{|N_G(f)|^2}{V_G(f)} \quad (37)$$

which makes it posible to obtain the following equation:

$$U(f) = \frac{\overline{T_H(f)}H(f) + A(f)\overline{T_G(f)}G(f)}{|T_H(f)|^2 + A(f)|T_G(f)|^2} \quad (38)$$

Where the notation ¯ is used herein to designate the complex conjugate.

$T_H$ and $T_G$ can be replaced by their expressions (1−Z) and (1+Z). In 2D and 3D propagation, $T_H$ and $T_G$ thus depend on f and on k. It is also possible to estimate hydrophone and geophone noise powers that depend on f and k, $V_H(f,k)$ and $V_G(f,k)$, in which case $A(f,k)=V_H(f,k)/V_G(f,k)$ also depends on f and k.

Using the notation A for either A(f) or A(f,k), equation (38) becomes:

$$U = \frac{(1-\overline{Z})H + A(1+\overline{Z})G}{1 + |Z|^2 - Z - \overline{Z} + A(A + |Z|^2 + Z + \overline{Z})} \quad (39)$$

As before, $U_R$ is defined as being equal to ZU. From (39), $U_R$ can be written:

$$U_R = \frac{-1}{1/2(A+1)(1+|Z|^2) + 1/2(A-1)(Z+\overline{Z})} [1/2(|Z|^2 - Z)H - 1/2A(|Z|^2 + Z)G]$$

In a ID approximation, $Z=e^{2j\pi f \Delta t}$, $|Z|^2 = 1$.

The latter property is also true in 2D and 3D propagation if the evanescent waves are not taken into account (the waves that are to be found in that portion of the (ω,k) domain in which $1 - v^2 k^2/\omega^2 < 0$). In seismic processing, evanescent waves are of no interest and they are commonly eliminated from the hydrophone and geophone components using techniques conventionally known by the person skilled in the art, and which are not described in greater detail herein. For the geophone component, this operation can be performed simultaneously with division by cosθ. Thus, $|Z|^2=1$ applies in all cases, which makes it possible to write:

$$U_R = \frac{-1}{A+1+1/2(A-1)(Z+\overline{Z})} [1/2(1-Z)H - 1/2A(1+Z)G] \quad (41)$$

We define filtering F(f) or F(f,k) as follows:

F=½(A+1)+½(A−1)Z (42)

If A=1, then F=1.

Expression (41) for $U_R$ can be written as follows using $Re(F)=(F+\overline{F})$=real portion of F:

$$U_R = \frac{-1}{2Re(F)} [1/2(1-Z)H - 1/2A(1+Z)G] \quad (43)$$

In the 1D case, $2Re(F)=[A(f)+1]+[A(f)-1]\cos 2\pi f\Delta t$. So the output M is defined by:

M=½(1−Z)H−½A(1+Z)G (44)

Equation (43) means that M=−2Re(F)ZU if the source is zero.

Taking the source into consideration, and replacing H and G in (44) by the expressions (6) and (7) therefor, the following is obtained:

M=FS−2Re(F)ZU (45)

The filtering FS is a weighted sum of the source S go-and-return propagated through the layer of water.

If the signal-to-noise ratio of the hydrophone and of the geophone are the same at each frequency, then A=1, so F=1, and equations (44) and (45) reduce to equations (9) and (10).

Implementation

Figure 4A:
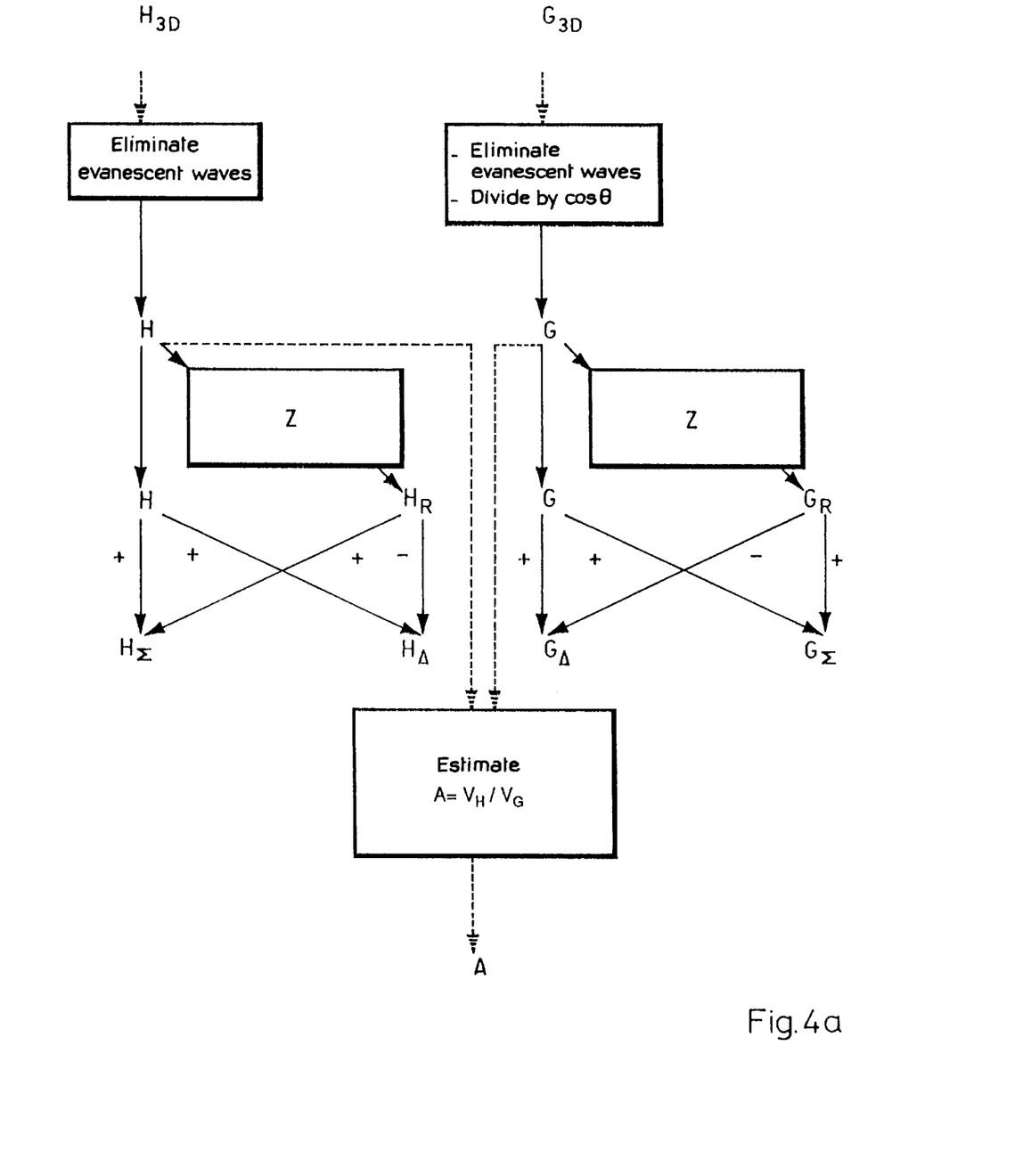
FIGS. 4a and 4b show a possible implementation of the method of the invention.
Figure 4B:
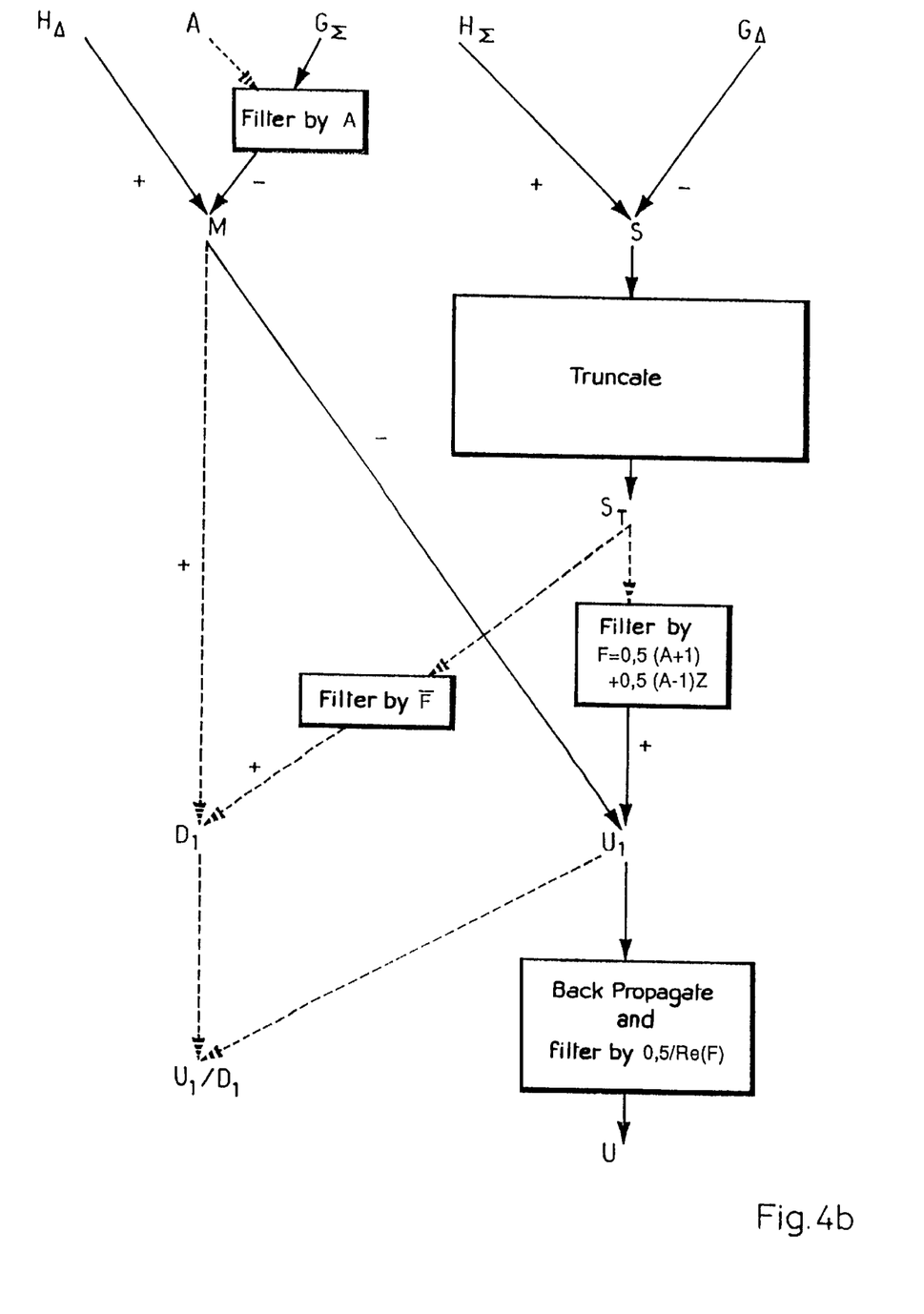

In the most general case where A is not equal to 1 and in which the three-dimensional nature of wave propagation is taken into consideration, an example of processing calibrated data comprises the following steps, as illustrated in FIGS. 4a and 4b:

1) For each position of the seismic source, data corresponding to different receiver positions is put together (collection for each firing point).

2) Evanescent waves are eliminated from the hydrophone data.

3) Evanescent waves are eliminated from the geophone data and wave amplitude is divided by cosθ.

4) The ratio A of hydrophone noise power over geophone noise power is estimated (scalar or dependent on f or dependent on f and on k).

5) Using a three-dimensional propagation operator Z, hydrophone and geophone data HR and GR is calculated for go-and-return propagated waves through the water layer (water bottom, water surface, water bottom).

6) The hydrophone and geophone sum and difference channels are calculated $H_\Sigma$, $H_\Delta$, $G_\Sigma$, $G_\Delta$.

7) The delayed source $S=H_\Sigma-G_\Delta$ is calculated and the truncated source ST is obtained by zeroing the trace of index i from the estimated source S for times greater than $T_i$. For each trace i, $T_i \geq MAX[T_E(i), T_P(i)]$ where $T_E(i)=\Delta T_s+(\Delta z(i)^2 + h(i)^2)^{1/2}/v$ is the extinction time of the source, $\Delta z(i)$ being the depth of the water for the receiver position of the trace and h(i) being the horizontal distance to the trace, i.e. the horizontal distance between the position of the source and the positions of the receivers, and where $T_P(i)$ is the time beyond which the approximations used in step 6) in the propagation operator Z and the approximations used in step 3) for the dip enhancement operator are acceptable.

8) The intermediate output M is calculated:

$M=H_\Delta-AG_\Sigma$ (46)

9) Where F is the following filter:

F=½(A+1)+½(A−1)Z (47)

The retarded up wave UR is calculated as follows:

$$U_R = \frac{FS_T - M}{2Re(F)} \quad (48)$$

10) The up wave U is calculated as follows:

$U=\overline{Z}U_R$ (49)

The operation $\overline{Z}$ is go-and-return back propagation through the layer of water, i.e. water bottom to water surface datuming for a wave that is assumed to be a down wave, followed by water surface to water bottom datuming for an up wave whose surface recording is the result of the first calculation.

U represents the seismic data without the receiver ghost wave.

U still contains the seismic source, the source ghost wave, and the multiple peg-legs, but it no longer contains that which is specific to data acquired at the water bottom, i.e. receiver ghosting. This means that the output U can be processed like conventional seismic data.

It is also possible to take advantage of the possibility of estimating the down waves D to deconvolute the up waves U by the down waves D. This makes it possible to remove the source with its ghost and the peg-legs. The down wave D is written:

$$D = S_T - U_R = \frac{\overline{F}S_T + M}{2Re(F)} \quad (50)$$

Deconvolution of the up waves by the down waves can thus be done by deconvolution of $\overline{Z}(FS_T M)$ by $\overline{F}S_T + M$, which avoids filtering by ½Re(F). Under such circumstances, steps 9) and 1) are replaced by the following steps:

9') $U_1$ and $D_1$ are calculated as follows:

$$U_1 = FS_T - M, \quad D_1 = \overline{F}S_T + M \quad (51)$$

10') Reflectivity $R_{SS}$ is calculated by deconvoluting the up waves $U_1$ with the down waves $D_1$.

The reflectivity $R_{SS}$, is reflectivity with the sources and the receivers at the water surface. The following applies:

$$R_{SS} = \frac{U_R}{D} = \frac{Z_U}{D} = \frac{Z^{1/2}U}{\overline{Z}^{1/2}D} = \frac{U_0}{D_0} \quad (52)$$

where $U_0$ and $D_0$ are the up and down waves at the surface of the water.

Reflectivity $R_{SF}$ (FIG. 3o) with sources at the water surface and receivers at the water bottom is expressed with the down wave at the water surface and the up wave at the water bottom. It can be calculated from $R_{SS}$ as follows:

$$R_{SF} = \frac{U}{D_0} = \frac{Z^{1/2}U_0}{D_0} = Z^{1/2}R_{SS} \quad (53)$$

This deconvolution reduces in the 1D case to solving:

$$R(t)*D(t) \approx U(t) \quad (54)$$

or in the 2D or 3D case to:

$$R(t,x) \underset{t,x}{*} D(t,x) \approx U(t,x)$$

or $$R(t,x,y) \underset{t,x,y}{*} D(t,x,y) \approx U(t,x,y)$$

where the dimension (1, 2 or 3) used for deconvoluting U by D is not necessarily the same as the dimension used for calculating U and D.

I claim:

1. A method of seismic prospecting offshore by means of at least one pair of hydrophone-geophone sensors disposed at the water bottom, in which a sound source at the surface of the water emits a sound signal and the sensors at the water bottom take hydrophone and geophone recordings H and G, the method comprising:
   (a) applying a propagation operator to the hydrophone and geophone recordings H and G in order to determine the hydrophone and geophone data $H_R$ and $G_R$ after an up and down propagation in the water,
   (b) determining with said propagated hydrophone and geophone data HR and $G_R$ the following $$H_\Sigma = \tfrac{1}{2}(H + rH_R)$$

$$H_\Delta = \tfrac{1}{2}(\overline{r}H - H_R)$$

$$G_\Sigma = \tfrac{1}{2}(\overline{r}G + G_R)$$

$$G_\Delta = \tfrac{1}{2}(G - rG_R)$$

where r is the negative inverse of the transfer function of the water surface, and $\overline{r}$ is the complex conjugate of r, and
   (c) determining the retarded up wave $U_R$ by calculating:

$$U_R = \tfrac{1}{2}(S_T - M)$$

where $M = H_\Delta - G_\Sigma$ and
   $S_T$ corresponds to the signal S corresponding to
   $S = H_\Sigma - G_\Delta$ truncated in a time window beyond the theoretical extinction time of the source propagated through the layer of water to the sensors.

2. A method according to claim 1, wherein, in order to determine the filtering M, a correction is applied to the data to take account of the difference between hydrophone noise power and geophone noise power.

3. A method according to claim 2, wherein the correction is such that the determined filtered signal M is as follows:

$$M = H_\Delta - AG_\Sigma$$

where A is the ratio of hydrophone noise power over geophone noise power.

4. A method according to claim 3, wherein a filtering F corresponding to $$F = \tfrac{1}{2}(A+1) + \tfrac{1}{2}(A-1)Z$$

is determined and the retarded up wave is calculated from:

$$U_R = \frac{FS_T - M}{2Re(F)}$$

5. A method according to claim 1, wherein the hydrophone and geophone data $H_R$, $G_R$ is determined by applying a two or three-dimensional propagation operator to the hydrophone and geophone recordings H and G, and wherein the geophone recordings are previously corrected by dividing the amplitude thereof by cos θ where $$\cos\theta = \sqrt{1 - v^2k^2/\omega^2}$$

v being speed of sound in the water, $\omega = 2\pi f$, where f is the frequency of the source, and k is its wave number.

6. A method according to claim 5, wherein the evanescent waves are eliminated from the geophone recordings simultaneously with the amplitude of the recordings being corrected by division.

7. A method according to claim 1, wherein, to determine the filtering M, a correction is applied to the data to take account of reflection at the water surface.

8. A method according to claim 1, wherein r=1.

9. A method of seismic prospecting offshore by means of at least one pair of hydrophone-geophone sensors disposed at the water bottom, in which a sound source at the surface of the water emits a sound signal and the sensors at the water bottom take hydrophone and geophone recordings H and G, the method comprising:
   (a) applying a propagation operator to the hydrophone and geophone recordings H and G in order to determine the hydrophone and geophone data $H_R$ and $G_R$ after an up and down propagation in the water,
   b) determining with said propagated hydrophone and geophone data $H_R$ and $G_R$ the following $$H_\Sigma = \tfrac{1}{2}(H + rH_R)$$

$$H_\Delta = \tfrac{1}{2}(\bar{r}H - H_R)$$

$$G_{93} = \tfrac{1}{2}(\bar{r}G + G_R)$$

$$G_\Delta = \tfrac{1}{2}(G - rG_R)$$

where r is the negative inverse of the transfer function of the water surface, and $\bar{r}$ is the complex conjugate of r, and (c) determining the down wave D immediately above the water bottom by calculating $$D = \frac{1}{2}(S_T + M)$$

where $M = H_\Delta - G_\Sigma$ and $S_T$ corresponds to the signal S corresponding to $S = H_\Sigma - G_\Delta$, truncated in a time window beyond the theoretical extinction time of the source propagated through the layer of water to the sensors.

10. A method according to claim 9, wherein, in order to determine the filtering M, a correction is applied to the data to take account of the difference between hydrophone noise power and geophone noise power.

11. A method according to claim 10, wherein the correction is such that the determined filtered signal M is as follows:

$$M = H_\Delta - A G_\Sigma$$

where A is the ratio of hydrophone noise power over geophone noise power.

12. A method according to claim 11, wherein a filtering F corresponding to $$F = \frac{1}{2}(A+1) + \frac{1}{2}(A-1)Z,$$

is determined and the down wave is calculated from $$D = \frac{\bar{F}S_T - M}{2R_e(F)}.$$

13. A method according to claim 9, wherein the hydrophone and geophone data $H_R$, $G_R$ is determined by applying a two or three-dimensional propagation operator to the hydrophone and geophone recordings H and G, and wherein the geophone recordings are previously corrected by dividing the amplitude thereof by cos 0 where $$\cos\theta = \sqrt{1 - v^2 k^2/\omega^2}$$

v being the speed of sound in the water, $\omega = 2\pi f$, where f is the frequency of the source, and k is its wave number.

14. A method according to claim 13, wherein the evanescent waves are eliminated from the geophone recordings simultaneously with the amplitude of the recordings being corrected by division.

15. A method according to claim 9, wherein, to determine the filtering M, a correction is applied to the data to take account of reflection at the water surface.

16. A method according to claim 9, wherein r=1.

17. A method of seismic prospecting offshore by means of at least one pair of hydrophone-geophone sensors disposed at the water bottom, in which a sound source at the surface of the water emits a sound signal and the sensors at the water bottom take hydrophone and geophone recordings H and G, the method comprising:

(a) applying a propagation operator to the hydrophone and geophone recordings H and G in order to determine the hydrophone and geophone data after an up and down propagation in the water, b) determining with said propagated hydrophone and geophone data $H_R$ and $G_R$ the following $$H_\Sigma = \tfrac{1}{2}(H + rH_R)$$

$$H_\Delta = \tfrac{1}{2}(\bar{r}H - H_R)$$

$$G_\Sigma = \tfrac{1}{2}(\bar{r}G + G_R)$$

$$G_\Delta = \tfrac{1}{2}(G - rG_R)$$

where r is the negative inverse of the transfer function of the water surface, and r is the complex conjugate of r, and c) determining the retarded up wave UR the down wave D immediately above the water bottom by calculating $$U_R = \frac{1}{2}(S_T - M)$$

$$D = \frac{1}{2}(S_T + M)$$

where $M = H_\Delta - G_{93}$ and $S_T$ corresponds to the signal S corresponding to $S = H_\Sigma - G_\Delta$, truncated in a time window beyond the theoretical extinction time of the source propagated through the layer of water to the sensors.

18. A method according to claim 17, wherein, in order to determine the filtering M, a correction is applied to the data to take account of the difference between hydrophone noise power and geophone noise power.

19. A method according to claim 18, wherein the correction is such that the determined filtered signal M is as follows:

$$M = H_\Delta - A G_\Sigma$$

where A is the ratio of hydrophone noise power over geophone noise power.

20. A method according to claim 3, wherein a filtering F corresponding to $$F = \frac{1}{2}(A+1) + \frac{1}{2}(A-1)Z,$$

is determined and the down wave and retarded up wave are calculated from:

$$D = \frac{FS_T - M}{2R_e(F)}$$

$$U_R = \frac{FS_T - M}{2Re(F)}.$$

21. A method according to claim 17, wherein the hydrophone and geophone data $H_R$, $G_R$ is determined by applying a two or three-dimensional propagation operator to the hydrophone and geophone recordings H and G, and wherein the geophone recordings are previously corrected by dividing the amplitude thereof by cos 0 where $$\cos\theta = \sqrt{1 - v^2 k^2/\omega^2}$$

v being the speed of sound in the water, $\omega 2\pi f$, where f is the frequency of the source, and k is its wave number.

22. A method according to claim 21, wherein the evanescent waves are eliminated from the geophone recordings simultaneously with the amplitude of the recordings being corrected by division.

23. A method according to claim 17, wherein, to determine the filtering M, a correction is applied to the data to take account of reflection at the water surface.

24. A method according to claim 17, wherein r=1.

25. A method according to claim 17, wherein, in order to eliminate multiple reflections of the peg-leg type, an up wave $U_1$ immediately beneath the bottom of the water is calculated as follows:

$$U_1 = U - K * D$$

where * designates the convolution operation, K being a water bottom transfer function calculated so as to minimise the energy of $U_1$ in a given time window.

* * * * *

UNITED STATES PATENT AND TRADEMARK OFFICE
CERTIFICATE OF CORRECTION

PATENT NO.  : 5,835,451
DATED       : November 10, 1998
INVENTOR(S) : Robert Soubaras It is certified that error appears in the above-identified patent and that said Letters Patent is hereby corrected as shown below:

At column 14, line 21, after "UR" insert --and-- therefor.

Signed and Sealed this

First Day of June, 1999

Attest:

Attesting Officer

Q. TODD DICKINSON

Acting Commissioner of Patents and Trademarks